United States Patent [19]

Kronogård

[11] 4,326,375
[45] Apr. 27, 1982

[54] GAS TURBINE-TRANSMISSION PLANT

[76] Inventor: Sven-Olof Kronogård, Karstorpsvägen 31, Lomma, Sweden, 23400

[21] Appl. No.: 123,727

[22] Filed: Feb. 22, 1980

Related U.S. Application Data

[62] Division of Ser. No. 835,035, Sep. 20, 1977, Pat. No. 4,220,057.

[30] Foreign Application Priority Data

Sep. 24, 1976 [SE] Sweden .............................. 7610579

[51] Int. Cl.³ .............................................. F02C 3/10
[52] U.S. Cl. ........................... 60/39.16 S; 74/674
[58] Field of Search ................... 60/39.16 S; 74/674, 74/665 A, 687

[56] References Cited

U.S. PATENT DOCUMENTS

| | | | |
|---|---|---|---|
| 3,488,947 | 1/1970 | Miller et al. | 74/687 |
| 3,498,057 | 3/1970 | Kronogard et al. | 60/39.16 S |
| 3,979,915 | 9/1976 | Kronogard | 60/39.16 S |
| 4,025,221 | 5/1977 | Kronogard | 60/39.16 S |
| 4,064,690 | 12/1977 | Kronogard | 60/39.16 S |

*Primary Examiner*—Louis J. Casaregola
*Attorney, Agent, or Firm*—Cantor and Singer

[57] ABSTRACT

In an automotive gas turbine power plant including at least one power turbine rotor and a further turbine rotor driving the compressor of the plant, the latter rotor is undersized with respect to the power consumption by the compressor during normal operation and is augmented from the power turbine rotor. The turbine rotors are interconnected by a stepped planetary gearing to which the output shaft is also connected. An infinitely variable transmission is provided between the input to and the output from the gearing for continuously changing the gear ratio.

5 Claims, 3 Drawing Figures

GAS TURBINE-TRANSMISSION PLANT

The present application is divided out of my copending application No. 835,035, (now U.S. Pat. No. 4,220,057) filed on the 20th of Sept. 1977, and claiming priority from Swedish patent application 76 10579-0, filed on the 24th of September 1976.

BACKGROUND OF THE INVENTION

Known automotive gas turbines of conventional design, having a free power turbine as a last stage, will encounter several difficulties. The auxiliaries of the plant are preferably driven from the gasifier portion in order to permit the power turbine to produce a full starting torque (about 2:1), and also to dispense with the torque converter in an automatic gear box (usually a torque converter+three ratios forward and one ratio reverse in an ordinary car) and the corresponding losses and costs. By adding the auxiliary drive to the gasifier portion the latter will have a slow acceleration performance, or will suffer from over-temperatures, meaning an increased fuel consumption and problems concerning exhaust gas emissions (NOx) and useful lifetime (hot components). In order to meet such troubles the hydraulic torque converter has been re-introduced, and it will then have to take care of the full output torque. In such manner the auxiliaries may be driven from the power turbine, which will always rotate when the plant is operating, and which drives the pump in the hydraulic torque converter. That will, however, imply extra losses. In order to reduce those a direct clutch (lock-up) has been introduced in the hydraulic torque converter, which at high speed locks the torque converter and eliminates its slip losses. Practical use has, however, shown that this "lock-up" is easily forgotten, and also with consideration to the driving the auxiliaries is used during very high speed only, which means that part-load fuel consumption will be high. This is especially noticeable during stall, when the power turbine speed increases and the torque ratio is reduced from 2:1 to about 1,5:1, which must be compensated by the torque converter.

The present invention aims at solving the problem, above referred to, by proposing a combined turbine-transmission system, which permits the output shaft being braked to standstill, without the speed of the power turbine being reduced to below that necessary for operating the auxiliaries. This is obtainable by means of the system without any hydraulic or other slipping member being used for the (full) torque of the plant, while simultaneously means are provided for obtaining a continuous variation of gear exchange ratio.

SUMMARY OF THE INVENTION

A gas turbine-transmission plant includes a first turbine driving the compressor, but being undersized with respect to the power consumption by the same during normal operation, at least one power turbine rotor, conventional auxiliaries, and a stepped planetary gearing interconnection the turbine rotors. According to the invention the stepped planetary gearing includes a planet carrier supporting a set of stepped planet gear wheels, each planet gear wheel having a small diameter at one end thereof and a big diameter at the other end, one sun wheel, as well as at least one ring wheel meshing with said set of planet gear wheels. Means including an infinitely variable transmission is provided for continuously changing the gear ratio between input and output at the gearing, and there is a further means including a variable transmission to extract power for augmenting the compressor turbine from said gearing.

The infinitely variable transmission is preferably arranged to provide exchange ratios when driving forwards as well as reverse.

The input to the planetary gearing may occur by way of the planet carrier, the gearing being provided with first and second ring wheels, and the infinitely variable transmission acting between the input and the first ring wheel. The output occurs by way of the second ring wheel, and the power to the compressor turbine occurs by way of the sun wheel.

Alternatively the input to the gearing and the transfer means to the compressor turbine may be connected to the sun wheel, while the infinitely variable transmission is located between the ring wheel and the output means, and the planet carrier is mounted upon the disengagable component of a clutch device having a stationary housing.

In a further embodiment the input may be connected to the planet carrier of a gearing provided with first and second ring wheels. The output then cooperates with a first ring wheel. The infinitely variable transmission is located between the planet carrier and a second ring wheel, and the power transfer means to the compressor turbine is connected to the sun wheel.

DESCRIPTION OF SOME PREFERRED EMBODIMENTS

Figure 1:
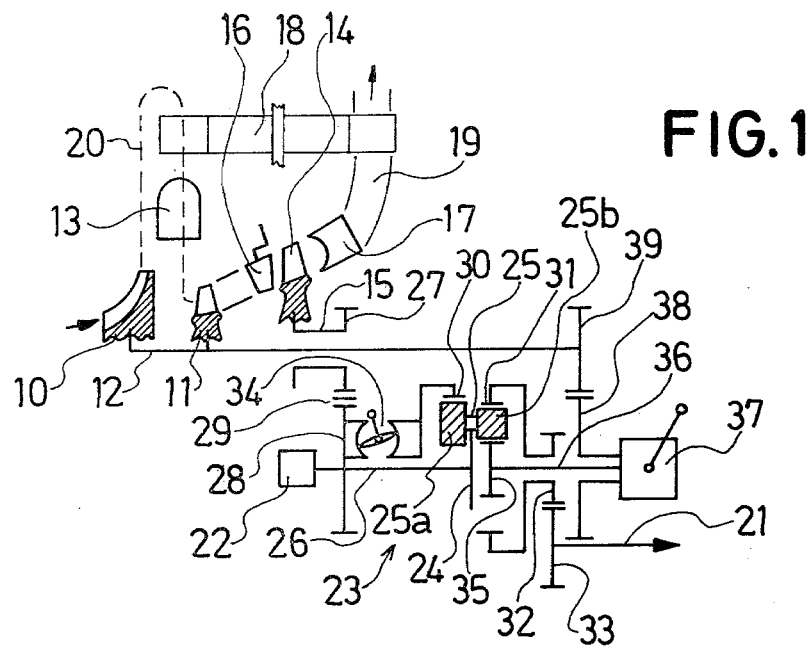
FIG. 1 shows a gas turbine plant according to the invention.

The gas turbine-transmission plant shown in FIG. 1 comprises a gasifier portion including a compressor 10 and a turbine rotor 11, drivingly connected to the compressor by being mounted upon the same shaft 12 as the latter. The compressor delivers air to a combustor 13. The gas generated therein will first pass through the compressor turbine 11 and then passes on to a power turbine rotor 14 mounted upon a shaft 15. Guide vanes 16 having variable geometry are provided between the two turbine rotors 11 and 14, and an outlet diffusor 18 is provided downstream of the power turbine.

The latter is shown as a single stage unit, but it is evident to anyone skilled in the art, that the power turbine may have two or more stages. As mentioned above the compressor turbine 11 is dimensioned so it cannot cover the power consumption of the compressor during normal operation. This is due to a desire to provide gas at an elevated temperature. High speed and high temperature will impose a heavy load upon the material of the rotor, and to reduce centrifugal action it is preferred to reduce the diameter of the rotor.

A rotatable heat exchanger 18 is arranged to transfer heat from the turbine exhaust 19 to the air passage 20, upstream of combustor 13.

The output shaft of the plant is denoted by 21, and the conventional auxiliaries, which may include an electric generator, and in this case the drive to the rotor of the heat exchanger 18 is denoted by 22.

A stepped planetary gearing 23 is provided between the shaft 15 of the power turbine and the output shaft 21 of the plant. There must be a reduction between the fast running turbine shaft and the speed acceptable at the output shaft, and above that there must be the conventional possibility to adjust the speed of the output shaft as required by occasional driving conditions.

A restriction to be taken into account with an automotive plant is that the power turbine may have to be stalled during occasional stops of the car. It is however necessary to drive the auxiliaries, and also to transfer power to the gasifier turbine 11, to ensure a satisfactory flow of gas during a following acceleration of the car.

The reasons for not driving the auxiliaries from the gasifier portion, and for making the gasifier tubine "undersized" have been explained above.

The planetary gearing comprises a planet carrier 24 supporting a set of stepped planet wheels 25, and connected to the input shaft 26 of the gearing. A gear wheel 27 at shaft 15 meshes with a gear wheel 28 at shaft 26 by way of an idler 29.

The planet wheels 25 are of a stepped design, i.e. they comprise integral end-portions having different diameters, a and b, respectively. The diameters of the planet gears and the components with which they cooperate form part of the basic exchange ratio of the gearing.

There is a first ring wheel 30 cooperating with planet gear 25a and a second ring wheel 31 transferring power to output shaft 21 by way of meshing gear wheels 32 and 33.

An infinitely variable transmission 34 is provided between gear wheel 28 and ring wheel 30 for varying the output speed as a result of the difference between the speed of the planet carrier 24 and ring wheel 30.

The infinitely variable transmission 34 is schematically illustrated only, and may be of any well known type. It will ensure a continuous changing of the gear ratio, when driving forwards, as well as in reverse.

A sun wheel 35 cooperates with planet gear 25b, and its shaft 36 is connected to a variable transmission 37, which by way of a gearing 38, 39 is connected to shaft 12 of the gasifier. Transmission 37 may be of a simple stepped type, but may be an infinitely variable transmission like 34 at the planetary gearing, and will allow a satisfactory amount of power being transferred to the gasifier turbine 11 during various driving conditions.

Figure 2:
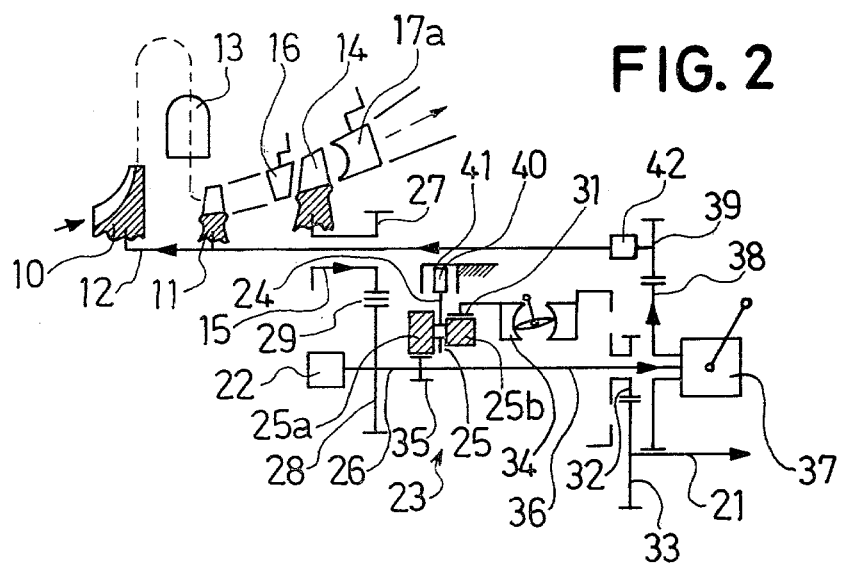
FIG. 2 shows a modified embodiment, where the planet carrier is mounted upon a clutch to provice a gear step.

The plant shown in FIG. 2 comprises the same basic components as the plant of FIG. 1, and like reference numerals are used whenever applicable.

Here the sun wheel 35 is mounted upon shaft 26 and provides the input to the gearing by way of planet wheels 25a. Shaft 36 to the further transmission 37 is also connected to sun wheel 35. The infinitely variable transmission is connected between ring wheel 31 and gear wheel 32, which meshes with gear wheel 33 at output shaft 21.

The planet carrier 24 is mounted upon the disengageable component 40 of a clutching device, the other component 41 of which is formed in the stationary housing surrounding the planetary gearing.

This clutch 40, 41 will provide an intermediate gear exchange step, reducing the size of the infinitely variable transmission 34.

The outlet diffuser of the gas turbine is provided with adjustable vanes 17a and a free-wheel 42 is provided between gear wheel 39 and the gasifier shaft 12.

Figure 3:
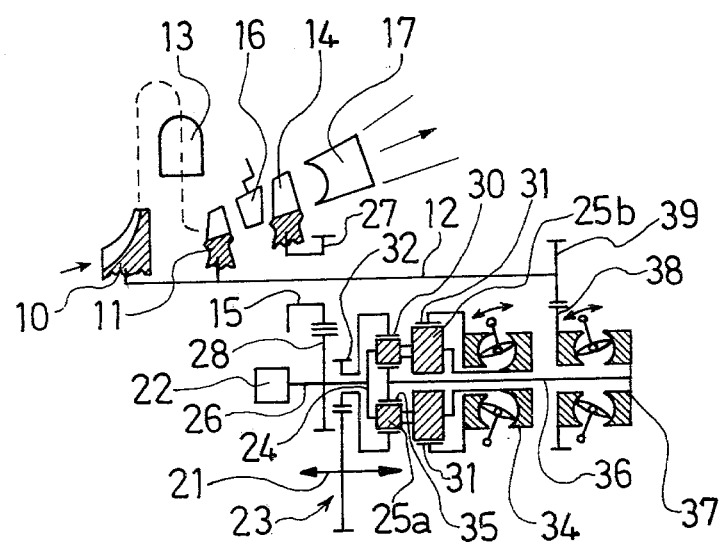
FIG. 3 shows a further embodiment, where the power transfer to the compressor turbine occurs by way of an infinitely variable transmission.

With the plant according to FIG. 3 the input shaft 26 to the planetary gearing 23 is connected to the planet carrier 24, which, in turn, is also connected to one component of the infinitely variable transmission 34. The other component thereof is connected to ring wheel 31 meshing with planet gears 25b. Ring wheel 30 meshing with planet gears 25a transfers the output to shaft 21 by way of gear wheels 32, 33.

The further transmission 37, which here is of the infinitely variable type is connected with the sun wheel 35, which meshes with planet gears 25a.

In all three embodiments there is thus a possiblity to obtain a continuous changing of the gear ratio, and also to operate auxiliaries and to keep the gasifier prepared for rapid acceleration requirements, in spite of occasional stalling of the power turbine.

The stepped planetary gear wheels may be modified in several ways, and may for instance be designed with cylindrical or conical gear teeth.

The embodiments above described are to be regarded as examples only, illustrating various applications of the invention, but further modifications, implying the addition, or the deletion of components, such as turbine or compressor stages, gear steps, free wheels and clutches, may be made within the scope of the appended claims.

What I claim is:

1. An automotive gas turbine-transmission plant comprising a compressor, a first turbine driving the same, at least one power turbine, as well as conventional auxiliaries,
   (A) said first turbine being undersized with respect to the power consumption of the compressor during normal operation,
   (B) stepped planetary gearing interconnecting said first and said at least one power turbine and including a planet carrier supporting a set of stepped planet gear wheels, a planet gear wheel having a small diameter at one end thereof and a planet gear wheel having a big diameter at the other end and further including one sun wheel, as well as at least one ring wheel meshing with said set of planet gear wheels,
   (C) first means to transfer power input from said at least one power turbine to said gearing,
   (D) second means to extract power from the gearing to an output shaft,
   (E) third means for continuously changing the gear ratio between input and output at the gearing, said third means including an infinitely variable transmission acting together with either of said first or second means, and
   (F) fourth means including a variable transmission to extract power for augmenting said first turbine from said gearing.

2. The automotive gas turbine-transmission plant according to claim 1, in which said infinitely variable transmission of the third means is arranged to provide exchange ratios when driving forwards as well as reverse.

3. The automotive gas turbine-transmission plant according to claim 1, in which said first means is connected to said planet carrier, said gearing is provided with first and second ring wheels, said third means acts between said first means and said first ring wheel, said second means cooperates with said second ring wheel and said fourth means is connected to said sun wheel.

4. The automotive gas turbine-transmission plant according to claim 1, in which said first means and said fourth means are connected to said sun wheel, said third means is located between said at least one ring wheel and said second means, and said planet carrier is mounted upon the disengagable component of a clutch device having a stationary housing.

5. The automotive gas turbine-transmission plant according to claim 1, in which said first means is connected to said planet carrier, said gearing is provided with first and second ring wheels, said second means cooperates with said first ring wheel, said third means is located between said planet carrier and said second ring wheel, and said fourth means is connected to said sun wheel.

* * * * *